United States Patent [19]
Wise et al.

[11] Patent Number: 5,415,755
[45] Date of Patent: May 16, 1995

[54] FASTENING ELEMENT FOR SECURING ELECTRODE JOINTS AND THE ELECTRODE USING SUCH

[75] Inventors: Francis E. Wise, Medina; Horace C. Moncrief, Strongsville; Robert E. Smith, Strongsville; Olin W. Hotchkiss, Strongsville; Michael Frastaci, Parma; Jerry L. Bjornestad, Brunswick, all of Ohio

[73] Assignee: Ucar Carbon Technology Corporation, Danbury, Conn.

[21] Appl. No.: 153,624

[22] Filed: Nov. 17, 1993

[51] Int. Cl.⁶ .................... C25C 3/08; C25C 3/12
[52] U.S. Cl. ............................. 204/280; 204/294; 204/279
[58] Field of Search ............. 204/279, 280, 294; 373/88, 91, 92; 252/502; C25C 3/12, 3/08

[56] References Cited

U.S. PATENT DOCUMENTS

| | | |
|---|---|---|
| 1,572,534 | 2/1926 | Hinckley . |
| 3,540,764 | 11/1970 | Paus et al. ............ 373/92 |
| 4,152,533 | 5/1979 | Gazda ................... 13/18 |
| 4,375,340 | 3/1983 | Faircloth, Jr. ........ 403/296 |

FOREIGN PATENT DOCUMENTS

520394 3/1931 Germany .

OTHER PUBLICATIONS

Mantell, Carbon and Graphite Handbook, 1979, Chapter #15 pp. 266–270. No month provided.

Primary Examiner—Kathryn Gorgos
Attorney, Agent, or Firm—F. J. McCarthy

[57] ABSTRACT

Electrode joint for threadably joining two abutting carbon electrode sections is provided with an elongate carbon fastening element which is force fitted into a passage extending from outside of the electrode joint through a portion of the interface contact between the abutting carbon electrode sections.

14 Claims, 6 Drawing Sheets

FASTENING ELEMENT FOR SECURING ELECTRODE JOINTS AND THE ELECTRODE USING SUCH

FIELD OF THE INVENTION

This invention relates to a fastening element for securing an electrode joint formed by a threaded nipple which connects together contiguous, abutting sections of carbon, including graphite, electrodes to provide a stable longitudinally extending electrode column for use in an electric arc furnace. More particularly, the present invention is directed to an electrode joint fastening element formed of carbon, including graphite, which is adapted to be friction fitted in a passage at the electrode joint.

BACKGROUND OF THE INVENTION

With state-of-the-art conventional carbon electrodes, a pair of longitudinally extending vertically positioned electrode sections are coupled by means of a threaded graphite nipple which is threaded into correspondingly threaded opposed sockets of the electrode sections, with the result that the respective opposing butt faces of the vertical electrode sections are brought into abutting contact. As an electrode section is consumed in the course of furnace operation, a new electrode section is tandemly coupled in the same manner so that furnace operation can proceed continuously. That is, as the lower end of the column is consumed in the furnace, the entire column is lowered to maintain the operation and electrode sections are joined to the top of the column to replenish the consumed columns. However, there is occasional loosening of the threadably engaged joint which can lead to increased electrical resistance and also to mechanical failure, i.e. breakage of a threaded nipple joint which requires the interruption of electric furnace operation.

An early prior art effort to address this problem with respect to horizontally positioned carbon electrode sections is disclosed in U.S. Pat. No. 1,572,534—Hinckley which describes a variety of blade shaped metal implements which are forced into the electrode joint and act as a key to prevent loosening of the joint. Due to the temperatures experienced in modern electric arc furnaces, a metal key would melt and be ineffective as the electrode joint approached the high temperature electrode arc from above.

SUMMARY OF THE INVENTION

It has been found, as part of the present invention, that threaded nipple joint failures commonly occur when the coupled carbon, including graphite, electrode sections and/or nipple loosen and are not firmly in abutting contact. Observation of such electrodes during furnace operation and examination of a number of failed threaded electrodes in nipple joints has shown that the coupled electrode sections were significantly separated due to loosening, i.e. rotation of the threaded joint and thus subject to relative movement during furnace operation, which condition often led to the joint failures.

It is, therefore, an object of the present invention to provide a means for ensuring the maintenance of a stable threaded joint for carbon, including graphite, electrode sections in order to avoid electrode joint failure.

This and other objects are accomplished by an extended carbon, including graphite, fastening element which is force fitted into a passage extending from outside of a threaded electrode joint through a portion of the interface contact between abutting carbon, including graphite, electrode sections.

BRIEF DESCRIPTIONS OF THE DRAWINGS

FIGS. 1(A) and 1(B) show elevation views, partly in section, of different threaded nipple joint configurations of the prior art;

Figure 5:
FIG. 5 and FIG. 5 (A) show an elongate graphite fastening element in accordance with the present invention.

FIGS. 8 (A and A'), 8 (B and B') show alternate configurations for the fastening element shown in FIG. 5;

DETAILED DESCRIPTION OF THE DRAWINGS

Figure 1A:
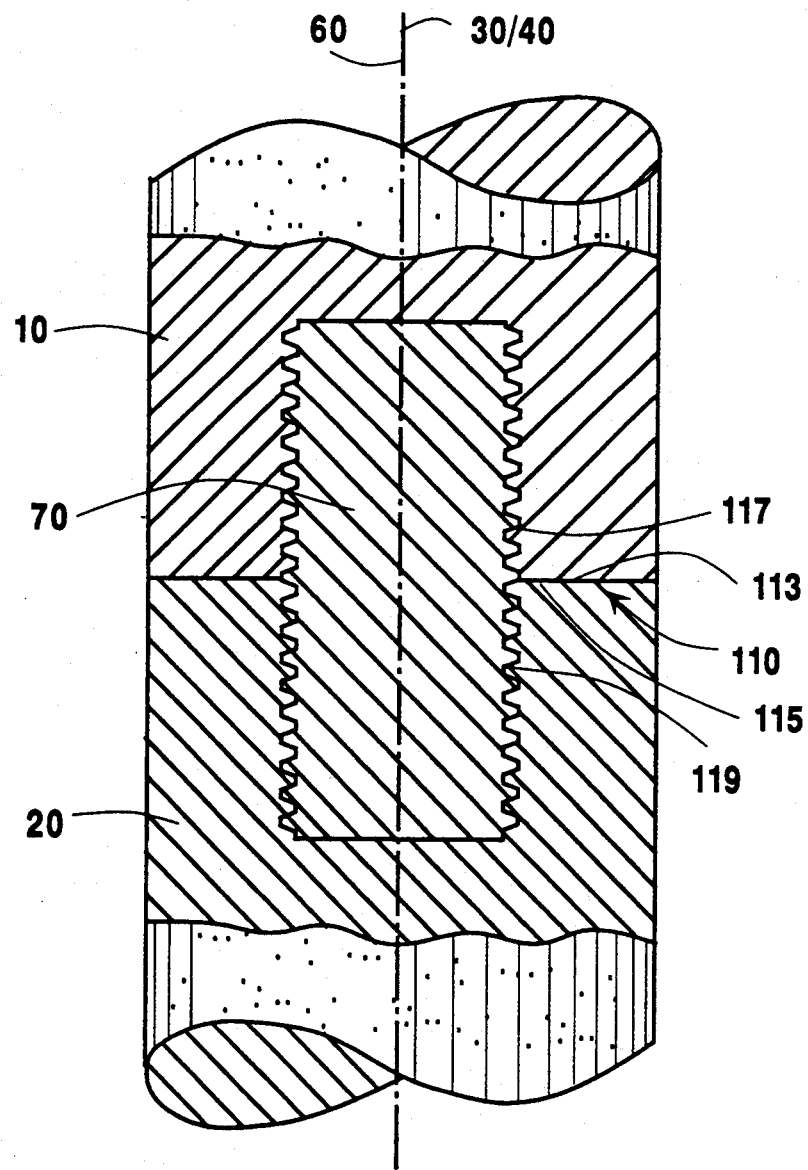
Figure 1B:
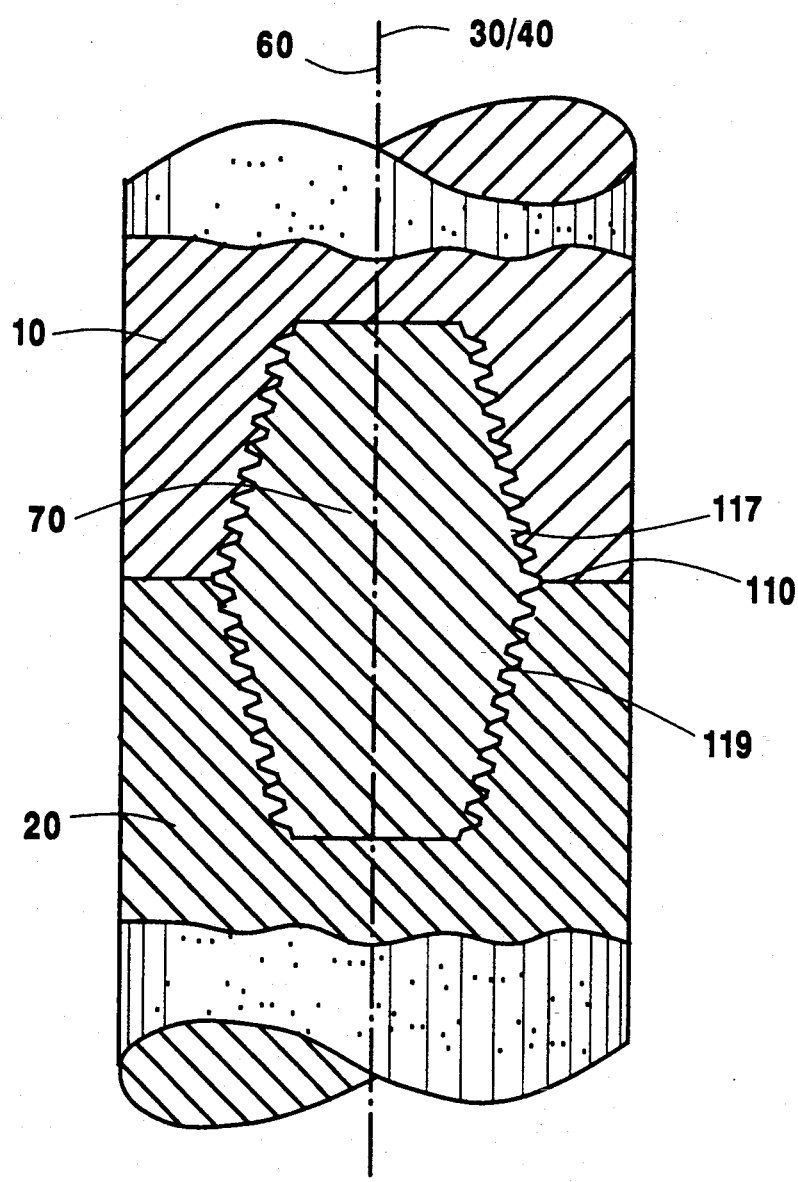
Figure 2:
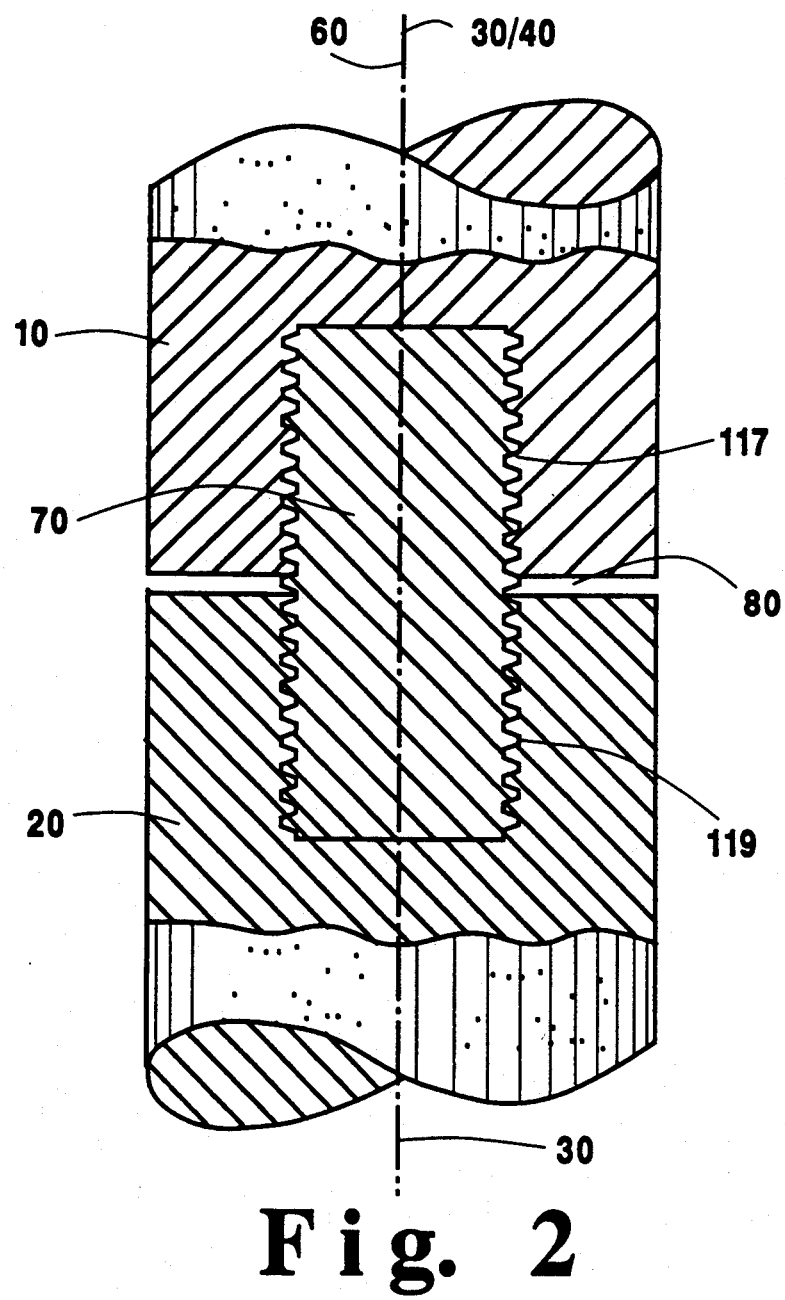
FIG. 2 is a partial elevation view which illustrates a partially unthreaded, loosened electrode joint configuration.

FIG. 1(A) shows a conventional carbon or graphite electrode joint arrangement for coupling the carbon or graphite electrode sections 10 and 20, which is shown also in FIG. 1(B). The opposed electrode sections 10, 20 are desirably coaxially aligned and threadably engaged to be in abutting relationship at contact interface 110 between transverse butt faces 113, 115 which have respective threaded sockets 117, 119 to avoid mechanical stress, with their longitudinal axes 30, 40 coincident as shown in FIG. 1(A) and FIG. 1(B), and also coincident with the central longitudinal axis 60 of cylinder-shaped threaded nipple 70 as shown. An alternate and frequently used conventional joint arrangement is shown in FIG. 1(B) wherein the threaded nipple 70 is double tapered. In the course of furnace operation, the joint comprising the threaded nipple and opposed electrode sections can be loosened and stresses are created which can result in breakage of the electrode sections. Due to severe vibrations encountered during electric furnace operation, the nipple 70 can become slightly unthreaded and loosened with a space 80 (somewhat exaggerated in FIG. 2 of the drawing) being developed between opposed electrode sections. This condition has been found to significantly contribute to the stresses which result in electrode joint mechanical failure, i.e. breakage.

Figure 3:
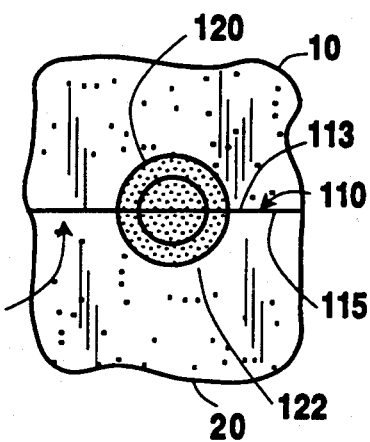
FIG. 3 shows a partial, sectional elevation view of a threaded joint being provided with a passage for receiving a fastening element in accordance with the present invention.
Figure 4:
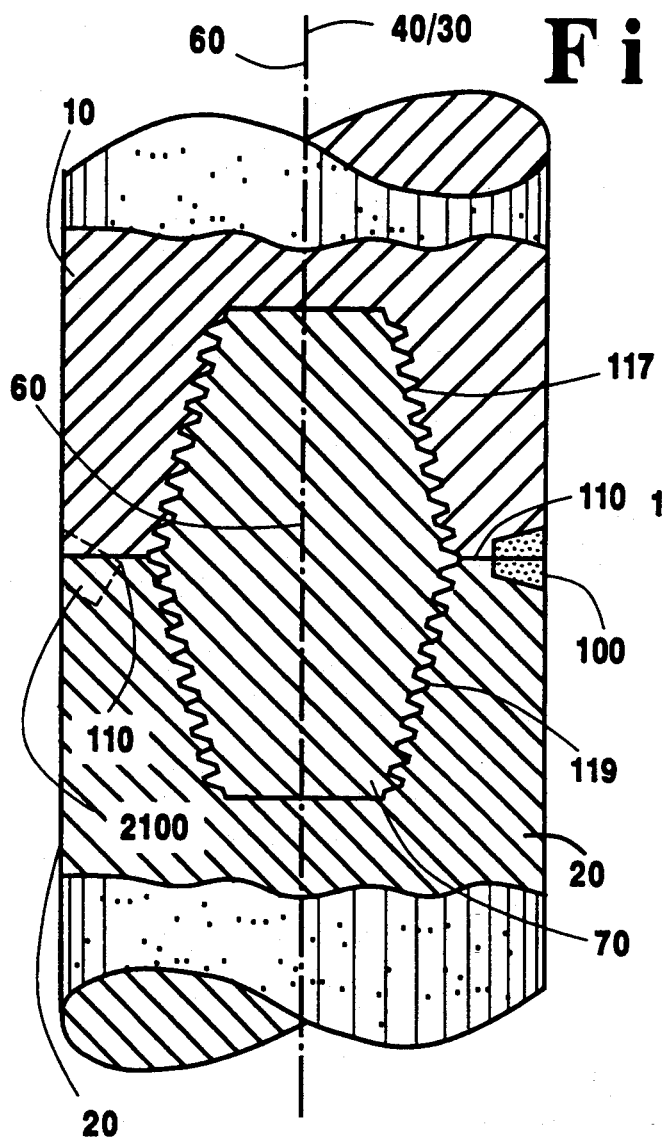
FIG. 4 is a partial side elevation view of the device of FIG. 3.
Figure 3A:
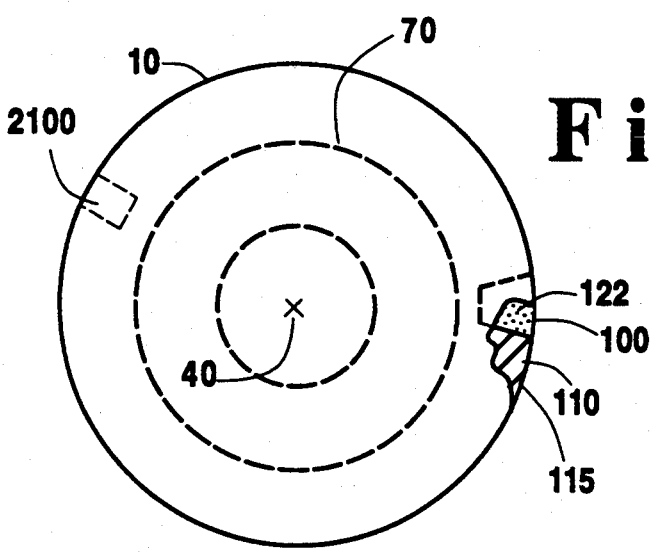
FIG. 3(A) is a top plan view of the device of FIG. 3.
Figure 5A:
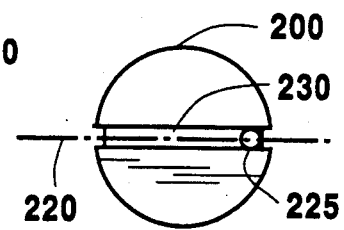
Figure 6:
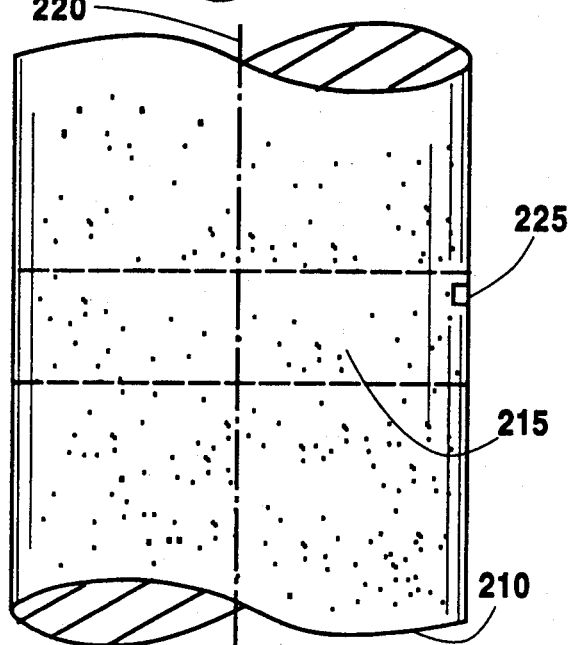
FIG. 6 and FIG. 6 (A) show graphite stock from which the fastening element of FIG. 5 is obtained.
Figure 6A:
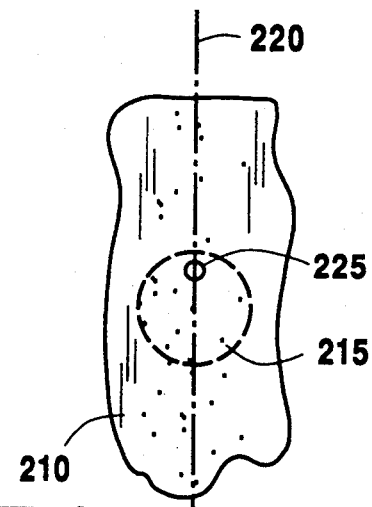
Figure 7:
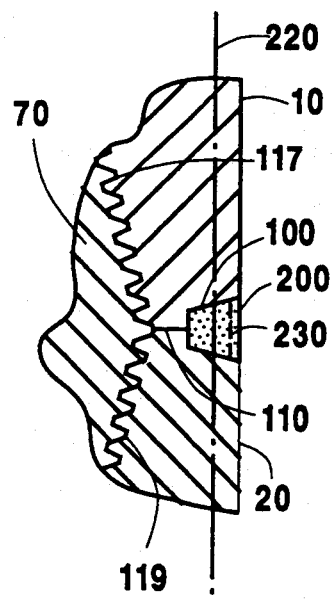
FIG. 7 and FIG. 7 (A) show the fastening element of FIG. 5 force fitted in the passage of FIG. 3.
Figure 7A:
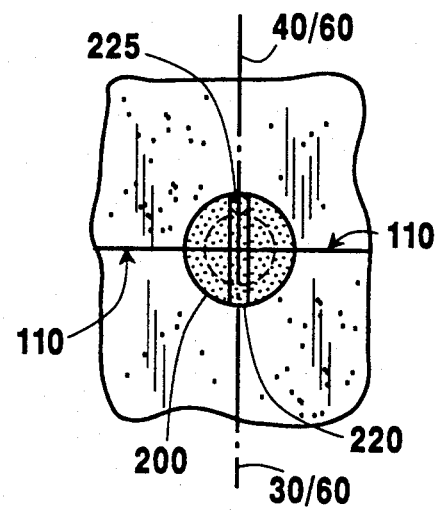
Figure 8A:
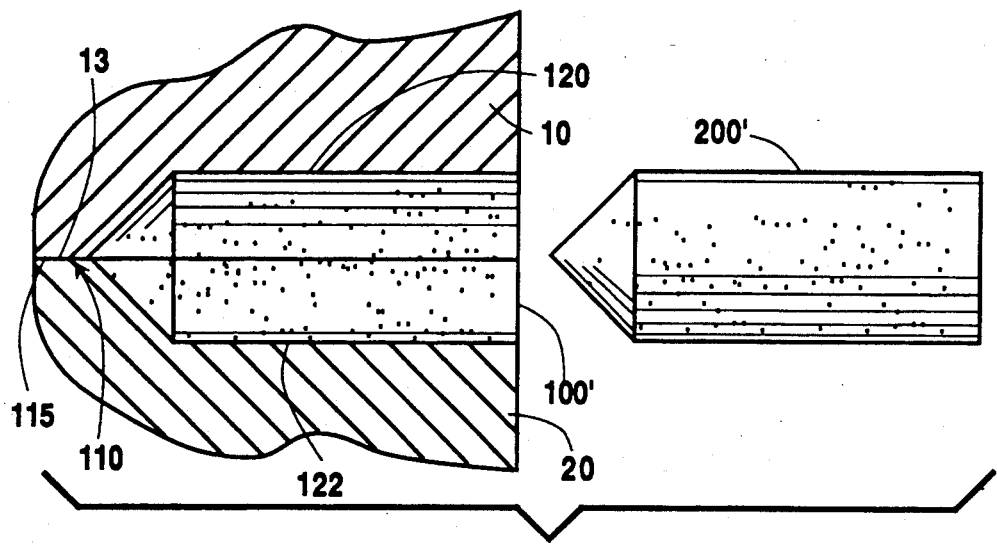
Figure 8B:
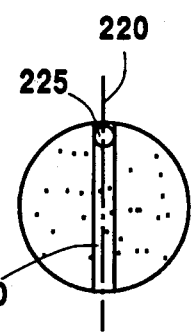
Figure 8C:
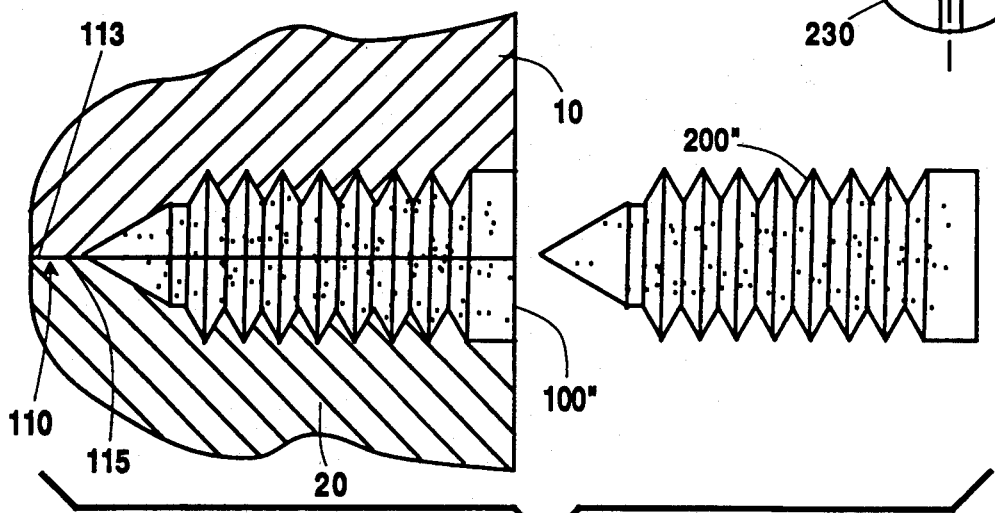
Figure 8D:
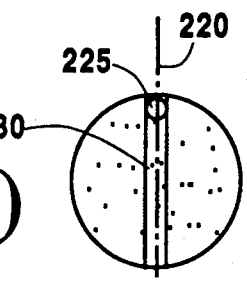

With reference to FIGS. 3, 3(A) and 4, this problem is avoided by providing a passage, or bore 100, which extends from outside the carbon or graphite electrode joint through a portion of the contact interface 110 between butt faces 113, 115 of abutting portions 120, 122 and through opposing abutting portions 120, 122 of electrode sections 10, 20. The electrode sections 10, 20, when made of graphite, are conventionally formed from extruded and baked stock and, as is well known, have a "with-the-grain" orientation, or direction, resulting from extrusion which is in the direction of their longitudinal axes. This condition is reported in "Carbon and Graphite Handbook"; Charles L. Mantell, Robert E. Krieger Publishing Company 1979, and in "Erdol & Kohle Erdgas Petrochemie" Vol. 43 Number 1 January 1990, "Anisotropy of Graphite Electrode Properties"; M. H. Wagner, G. Wilhelmi. The nipple 70 is also formed from graphite and has been machined from similarly extruded and baked stock so that it has a "with-the-grain" orientation in the direction of its longitudinal axis 60. The anisotropy of an extruded graphite electrode is particularly pronounced as regards its Coefficient of Thermal Expansion (CTE) which for a particular grade of graphite electrode can be from 10% to 300% greater in the "across-the-grain" direction as compared to the "with-the-grain" direction. This is readily apparent from the Tables at pp. 328–336 in the above-noted "Carbon and Graphite Handbook". With reference to FIGS. 5, 5(A), in the preferred embodiment of the present invention, for a graphite electrode joint, an elongate graphite fastener element has been formed by machining from extruded and baked stock 210 by taking a core 215 which is transverse to the longitudinal axis 220 of extruded and baked stock 210. This core was pre-marked with visual indicia 225, e.g. a drilled hole, to identify the "with-the-grain" direction or orientation of the core 215. A diametrical groove 230 indexed from visual indicia 225 further identifies the "with-the-grain" orientation of the elongate graphite fastener element 200. The groove 230 can be extended along the length of fastener element 200 as shown at 231 to allow for some compression of element 200 when it is suitably shaped and force fitted into passage 100 as shown in FIGS. 7 and 7(A) to be substantially, e.g. 80% or more coextensive therewith. If required, any portion of the fastening element extending outside the bore can be removed e.g. by grinding so that the fastening element does not extend beyond the outer periphery of the electrode sections. As shown in FIG. 7(A), the visual indicia 225 and groove 230 are positioned so that the "with-the-grain" direction 220 of graphite fastener element 200 is the same as the "with-the-grain" directions 30, 40, 60 of graphite electrode sections 10, 20 and threaded nipple 60. As a result, the anisotropy characteristics of the respective CTE's of the electrode sections and threaded nipple are in alignment with that of the fastener and the generation of additional stresses due to thermal expansion of these parts in the course of high temperature furnace operation is minimized and virtually eliminated, and the loosening of the threaded electrode joint is avoided by the mechanical locking provided by the fastener. In some furnace applications, it is not essential that the anisotropy characteristics of the fastening element be in alignment with that of the electrode sections and the nipple, and in this instance, the fastening can be fitted in the passage passing through the electrode joint without regard to anisotropy alignment and without any indicia anisotropy alignment.

The following example will illustrate the present invention:

EXAMPLE

A graphite fastening element of cylindrical cross-section and of the shape shown in FIG. 8(A and A') was prepared for securing the threaded joint for two abutting 24 inch diameter (600 mm) graphite electrode sections. The fastener was 1.253 in (31.83 mm) in diameter and 4 inches (101.6 mm) in length. The "with-the-grain" orientation of the fastener was visually indicated by a groove cut in its flat (outside) face. A drill bit 1.25 inches in diameter (31.75 mm) was used with a cordless 10.8 volt driver drill to drill a radial horizontal, cylindrical passage, i.e. bore, into the vertical graphite electrode at the contact interface of the electrode sections. The cylindrical passage (bore) was 4 inches deep (101.6 mm). The bore was cleared of graphite particles using a compressed air nozzle. The fastening element with its "with-the-grain" groove in the vertical position in-line with the vertical electrode was tapped into the bore at the interface with a hammer until it was flush with the electrode and in a forced friction fit within the bore and substantially coextensive therewith. The joined electrode sections were used successfully in electric furnace operation without nipple joint failure.

FIGS. 7, 7(A) show alternate shapes for the graphite fastening element which are installed to have a friction fit and "with-the-grain" orientation with the electrode sections of the joint.

In the practice of the present invention, the bore for receiving the fastener element preferably extends equally through each of the abutting electrode sections for about 15 to 75% of the distance from the outside of the electrode sections to the nipple socket and is preferably in a radial direction with respect to the longitudinal axes of the electrode sections and transverse thereto. In some instances, however, it may be suitable for the bore to be offset from a transverse radial direction as shown somewhat schematically at 1100 and 2100 in FIGS. 3 and 3(A).

The engagement of the fastener with the electrode sections is a force or friction fit achieved by hand tapping with a hammer a slightly oversized smooth sided fastener into the bore or threading a slightly oversized threaded fastener into a threaded bore.

What is claimed is:

1. In a carbon electrode joint comprising two vertically positioned longitudinally coaxially aligned abutting electrode sections, each said electrode section having a butt face transverse to its longitudinal axis and a threaded socket in its butt face, and a correspondingly threaded nipple in said socket longitudinally coaxially aligned with and joining said electrode sections in an abutting relationship to define a contact interface between the butt faces of the electrode sections which extends transverse to the longitudinal axes of the electrode sections, each said electrode section and said threaded nipple are formed from extruded and baked stock which was extruded so that the respective longitudinal axes and electrode sections and threaded nipple extend in a with-the-grain direction, wherein the improvement comprises a bore-shaped passage extending from outside of the electrode joint through only a portion of said contact interface and through opposing abutting portions of said electrode sections and an elongate carbon fastening element formed from extruded and baked stock and having a with-the-grain direction resulting from its extrusion and having a longitudinal axis which is transverse to its with-the-grain direction, said fastening element is force fitted in said passage having its with-the-grain direction in-line with the with-the-grain direction of the electrode sections.

2. An electrode joint according to claim 1 wherein said passage is a circular cross-section bore extending toward and transverse to the coaxial longitudinal axes of the electrode sections and is substantially equally partitioned between the respective electrode sections, and said fastening element has a circular cross-section and has visual indicia from which its with-the-grain direction can be determined.

3. An electrode joint in accordance with claim 2 wherein the bore is threaded and the fastening element is correspondingly threaded.

4. An electrode joint in accordance with claim 2 wherein said bore is inwardly tapered and the fastening element is correspondingly tapered.

5. An electrode joint in accordance with claim 2 wherein said bore is cylindrical and said fastening element is cylindrical.

6. An electrode joint in accordance with claim 2 wherein said fastening element has at least one external groove extending in the same direction as the bore.

7. A fastening element for securing a joint between opposed abutting graphite electrode sections comprising a longitudinally extending elongate graphite article formed from extruded and baked stock having a "with-the-grain" orientation transverse to its longitudinal axis and having visual indicia of its "with-the-grain" orientation.

8. In a carbon electrode joint comprising two vertically positioned longitudinally coaxially aligned abutting electrode sections, each said electrode section having a butt face transverse to its longitudinal axis and a threaded socket in its butt face, and a correspondingly threaded nipple in said socket longitudinally coaxially aligned with and joining said electrode sections in an abutting relationship to define a contact interface between the butt faces of the electrode sections which extends transverse to the longitudinal axes of the electrode sections, each said electrode section and said threaded nipple are formed from extruded and baked stock which was extruded so that the respective longitudinal axes and electrode sections and threaded nipple extend in a with-the-grain direction, wherein the improvement comprises a bore-shaped passage extending from outside of the electrode joint through a portion of said contact interface and through opposing abutting portions of said electrode sections and an elongate carbon fastening element force fitted in said passage.

9. An electrode joint according to claim 8 wherein said passage is a circular cross-section bore extending toward and transverse to the coaxial longitudinal axes of the electrode sections and is substantially equally partitioned between the respective electrode sections.

10. An electrode joint in accordance with claim 9 wherein the bore is threaded and the fastening element is correspondingly threaded.

11. An electrode joint in accordance with claim 9 wherein said bore is inwardly tapered and the fastening element is correspondingly tapered.

12. An electrode joint in accordance with claim 9 wherein said bore is cylindrical and said fastening element is cylindrical.

13. An electrode joint in accordance with claim 9 wherein said fastening element has at least one external groove extending in the same direction as the bore.

14. A fastening element for securing a joint between opposed abutting graphite electrode sections comprising a longitudinally extending elongate graphite article formed from extruded and baked stock.

* * * * *